United States Patent [19]

Tsurunaga

[11] Patent Number: 5,225,957
[45] Date of Patent: Jul. 6, 1993

[54] CURRENT LIMITING DEVICE
[75] Inventor: Kazuyuki Tsurunaga, Tokyo, Japan
[73] Assignee: Kabushiki Kaisha Toshiba, Kawasaki, Japan
[21] Appl. No.: 526,938
[22] Filed: May 22, 1990
[30] Foreign Application Priority Data May 22, 1989 [JP] Japan .................. 1-128396
Oct. 31, 1989 [JP] Japan .................. 1-283199
Oct. 31, 1989 [JP] Japan .................. 1-283200

[51] Int. Cl.$^5$ ............................................. H02H 9/00
[52] U.S. Cl. ........................ 361/19; 361/141; 361/58; 505/850
[58] Field of Search ............... 361/19, 58, 10, 11, 361/111, 141; 323/360; 505/850, 881

[56] References Cited

U.S. PATENT DOCUMENTS

| | | | |
|---|---|---|---|
| 2,350,195 | 5/1944 | Rypinski | 361/19 |
| 3,925,707 | 12/1975 | Bhate et al. | 361/19 |
| 4,688,137 | 8/1987 | Urata | 361/141 |
| 4,700,257 | 10/1987 | Bekhaled | 361/19 |
| 4,910,626 | 3/1990 | Collet et al. | 361/19 |
| 4,930,034 | 5/1990 | Kusserow et al. | 361/19 |
| 5,021,914 | 6/1991 | Tsurunaga et al. | 361/19 |

FOREIGN PATENT DOCUMENTS 48-2038 1/1973 Japan .

*Primary Examiner*—Todd E. De Boer
*Attorney, Agent, or Firm*—Foley & Lardner

[57] ABSTRACT

An improvement of a current limiting device using a superconductive coil. A trigger coil and current limiting coils are formed as a superconductive coil. A switching element which is actuated when a current limiting operation by the current limiting coil occurs, is connected in series to the trigger coil to immediately suppress heat generation by the trigger coil. When a quenching is detected by a detector, the trigger coil is disconnected and an additionally provided recovery coil is connected to speed up the recovery operation. A plurality of trigger coils connected in series may be used.

8 Claims, 7 Drawing Sheets

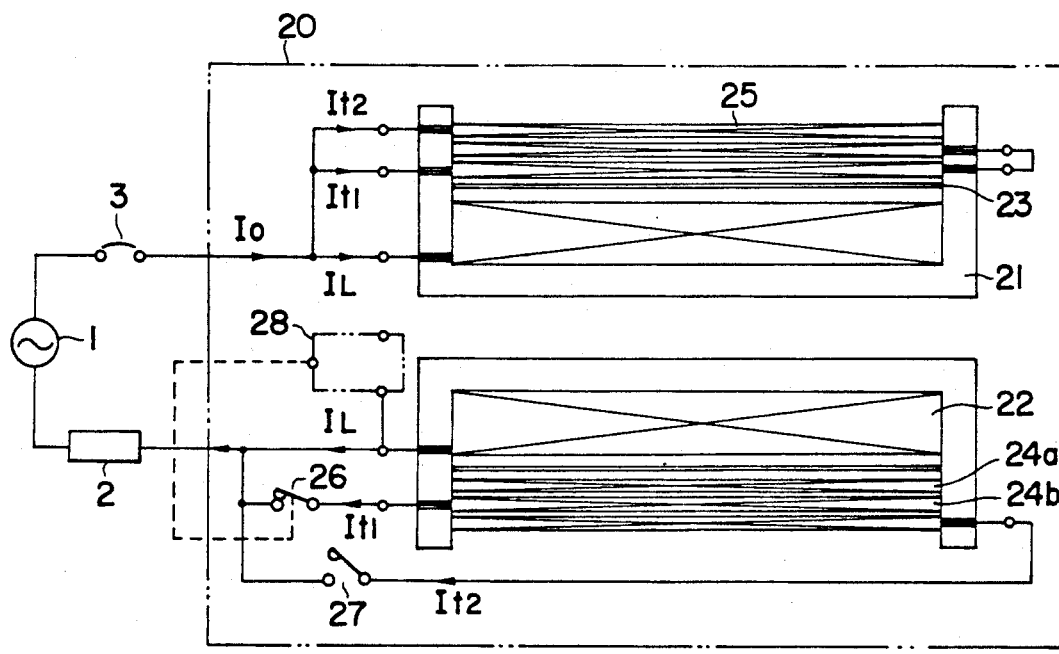
F I G. 4
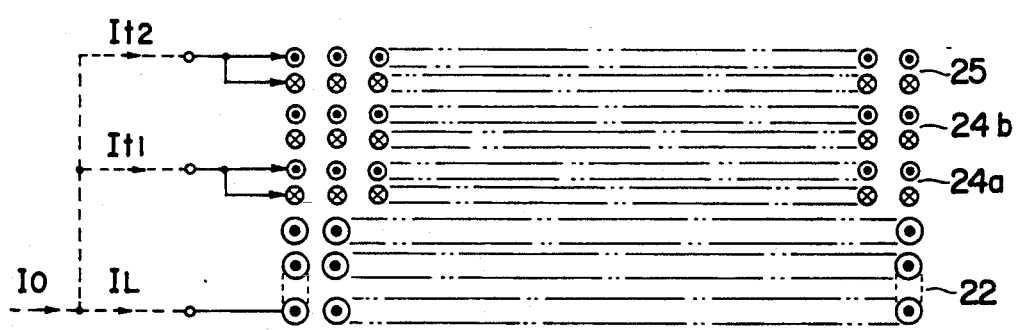
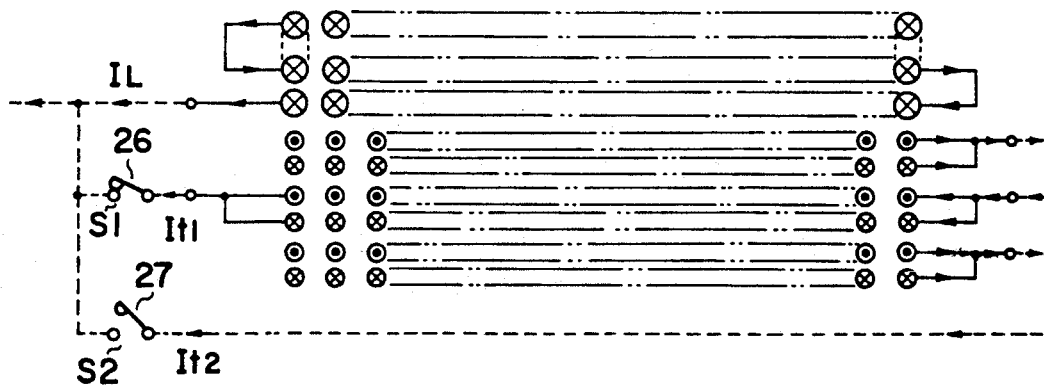
F I G. 5

CURRENT LIMITING DEVICE

BACKGROUND OF THE INVENTION

The present invention relates to a current limiting device for electromagnetically suppressing an overcurrent in an a.c. current path.

In order to protect an electric apparatus from an overcurrent caused by an interline short circuit or ground short circuit in a current path of, e.g., a distribution line, an overcurrent flowing through the electric apparatus is required to be limited at once to a certain low value. Of current limiting devices for limiting an overcurrent, the device of the type using a superconductive coil is known as disclosed, e.g., in Japanese Patent Laid-open No. 48-2038 (1973).

FIG. 1 shows the structure of the current limiting device disclosed in the above-mentioned publication. In this current limiting device, a low temperature container 53 with a conduit 54 for a cooling medium such as helium is provided. In the container, coils 51 and 52 made of superconductive material are wound about a common spool. In a current path through which power is supplied to the coils, there are connected in series an ordinary conductive reactor 55 and a switch 59. The directions of magnetomotive forces generated by the coils 51 and 52 are arranged to be opposite to each other, and the critical current values of the coil 51 is set lower than that of the coil 52.

The operation of the above-described current limiting device will be described below. In an ordinary current operation, both the coils 51 and 52 are in a superconductive state so that there is only a leakage flux $\Phi s$ between the coils, i.e., only a leakage reactance component, to thereby allow a low loss power supply. In contrast, when an overcurrent appears in a current path 58, the coil 51 having a lower critical current value quenches first and changes into an ordinary conductive state to have a high resistance. The current flowing through the coil 51 is therefore limited by the high resistance, and almost all the current is transferred to the coil 52 which is in a superconductive state. Magnetic flux passing through the coil 52 is generated and a corresponding inductance is produced therein. This inductance component suppresses the overcurrent. Thereafter, an operator opens the switch 59 to completely disconnect the current path. This current path disconnection is performed in order to suppress further consumption of expensive cooling medium (e.g. helium) caused by evaporation due to heat generation by the coil 51.

However, the switch is required to be opened by the operator so that a time delay of disconnection poses the problem of consuming the cooling medium.

Another current limiting device is also known as disclosed in Japanese Patent Laid-open Publication No. 63-253315 (1988) wherein about the outer circumferential periphery of a superconductive coil wound non-inductively, there is wound a superconductive reactor having a larger critical current value than that of the superconductive coil.

This current limiting device however is not satisfactory in that the non-inductive superconductive coil or trigger coil has a large loss at the quenching state depending on the value of the quenching resistance if the system voltage is high, thereby deteriorating the superconductive wire due to heating, or in some cases burning or melting the wire.

It is therefore necessary that the quenching resistance value of the trigger coil be made larger as the system voltage becomes higher. However, according to conventional technology, the necessary larger quenching resistance value results in a bulky current limiting device. A compact device has thus been desired.

Further,, after the current limiting operation is carried out after an accident has occurred in the system and the cause of the accident is removed, it is also desired to recover the ordinary state of the current limiting device as soon as possible. However, with the conventional technology, if a trigger coil quenches once, the recovery to the superconductive state thereof requires a cooling period on the order of at least one second after the disconnection of the current path. Until such a cooling period is completed, the current limiting device as a whole cannot recover its ordinary state.

The current limiting device of the type shown in FIG. 1 is generally used in suppressing a short circuit current in a current path of high voltage and large current. For example, such a current limiting device is applied to each feeder of a power distribution unit having rated values of 6.6 KV and 600 A. In this case, the requirements of the current limiting device are that the current limiting operation starting current is 1200 A, the operating impedance is 2 ohms, and the current limiting peak value is about 3 KA. In order to satisfy such requirements, the inductance of the current limiting coil 52 should be about 6.5 mH for the 50 Hz system. In addition, the coil is required to be made of a superconductive wire having a critical current value larger than 3 KA so that the structure of the coil becomes necessarily of a multi-layer wound type.

With the current technology, the structure of the coil 52 has the following dimensions, for example. The inner diameter is 100 mm, the outer diameter is 200 mm, the coil length is 40 mm, and the number of coil turns is 400, constructed of ten layers. In order to minimize the leakage reactance (ordinary impedance) of the device, the other coil 51 is disposed under the coil 52 and constructed to have a magnetomotive force substantially the same as that of the coil 52 and opposite in direction.

The rate of cancelling magnetic fluxes of the coils 51 and 52, however, decreases as the difference between coil cross sections becomes large. The above-described illustrative device has a leakage inductance of about 1 mH which acts as the ordinary impedance of the current limiting device, resulting in a drop of the supply voltage. For example, about a 190 V voltage drop will be generated by the above-described current limiting device having the rated values of 6.6 KV and 600 A.

As described above, with a conventional superconductive current limiting device, the higher the voltage of the system circuit is, the larger the operating impedance (impedance of the coil 52) required, resulting in an increase of the leakage inductance and ordinary voltage drop.

SUMMARY OF THE INVENTION

It is therefore an object of the present invention to provide a superconductive current limiting device capable of limiting an overcurrent generated in a current path, and immediately acting to remove thermal trouble caused by the overcurrent to thereby suppress evaporation of a cooling medium such as liquid helium.

It is another object of the present invention to provide a current limiting device capable of being constructed compact by even for use with a high voltage system, and immediately recovering an ordinary running condition.

It is a still further object of the present invention to provide a current limiting device capable of maintaining the ordinary impedance at a minimum irrespective of the value of the current limiting impedance, and reducing a loss by a supply voltage drop at the coil which quenches during the operation, i.e., during an overcurrent.

According to one aspect of the current limiting device of this invention, there is provided a superconductive current limiting device comprising a first superconductive coil and a second superconductive coil as a current limiting coil having a critical current value larger than that of the first superconductive coil, and a switching element connected in series to the first superconductive coil the element of which opens in response to the current suppressing operation of the second superconductive coil, the second superconductive coil being connected in parallel with the serially connected switching element and first conductive coil. Upon the occurrence of an overcurrent, almost all the current is therefore transferred to the second superconductive coil and the corresponding magnetic field is generated. The generated magnetic field causes the switching element to open and suppress the flow of the overcurrent. The switching element opens at the same time as when the second superconductive coil generates a magnetic field so that the operation of opening the switch element is reliably carried out at high speed without any delay. Therefore, the thermal problem caused by the overcurrent can be immediately removed and the evaporation of cooling medium such as liquid helium can be suppressed.

According to another aspect of the current limiting device of this invention, there is provided a superconductive current limiting device for suppressing an overcurrent in a current path, comprising: a plurality of first superconductive coils (trigger coils) connected in series, wound non-inductively, and having a first critical current value; a second superconductive coil (recovery coil) wound non-inductively and having the same critical current value as that of the first superconductive coils; a current limiting element having an optional inductance and a second critical current value larger than that of said first superconductive coils; quenching detecting means for detecting a quenching of said first superconductive coils; normally closed first switching means connected in series to said first superconductive coils, said first switching means being opened in response to a quenching detection output from said quenching detecting means; and normally open second switching means connected in series to said second superconductive coil, said second switching means being closed after a current limiting operation; wherein a serial circuit of said first superconductive coils and first switching means and a serial circuit of said second superconductive coil and second switching means are connected in parallel with said current limiting element.

With this current limiting device, a plurality of trigger coils connected in series are used so that the resistance of the trigger coils during the current limiting operation is high, and the impedance during the ordinary operation can be reduced, with considerable reduction of loss during the operation Accordingly, the amount of cooling medium that evaporates is reduced and a freezer can be made more compact, to thereby reduce the overall dimension of the device.

In addition, there is provided a superconductive recovery coil to allow the trigger coils to rapidly enter a superconductive state, to thereby speed up the ordinary operation recovery.

According to a further aspect of the current limiting device of this invention, there is provided a superconductive current limiting device for suppressing an overcurrent in a current path, comprising: a plurality of first superconductive coils (trigger coils) each wound non-inductively and having substantially the same first critical current value; a current limiting element having an optional inductance and a second critical current value larger than that of said first superconductive coils; and a normally closed switch connected in series to said first superconductive coils, said switch being opened upon quenching of said superconductive coils; wherein a serial circuit of said first superconductive coils and switch is connected in parallel with said current limiting element.

With this current limiting device, a plurality of trigger coils connected in series are used so that the resistance of the trigger coils during the current limiting operation is high, and the impedance during the ordinary operation is reduced, with considerable reduction of loss during the operation. Accordingly, the medium can amount of cooling medium that evaporates is reduced and a freezer can be made more compact, to thereby reduce the overall dimension of the device.

BRIEF DESCRIPTION OF THE DRAWINGS

In the accompanying drawings,

FIG. 4 is a schematic diagram showing the structure of a second embodiment of the current limiting device according to the present invention;

FIG. 5 illustrates the arrangement and interconnection of the coils shown in FIG. 4;

DESCRIPTION OF THE PREFERRED EMBODIMENTS

Figure 1:
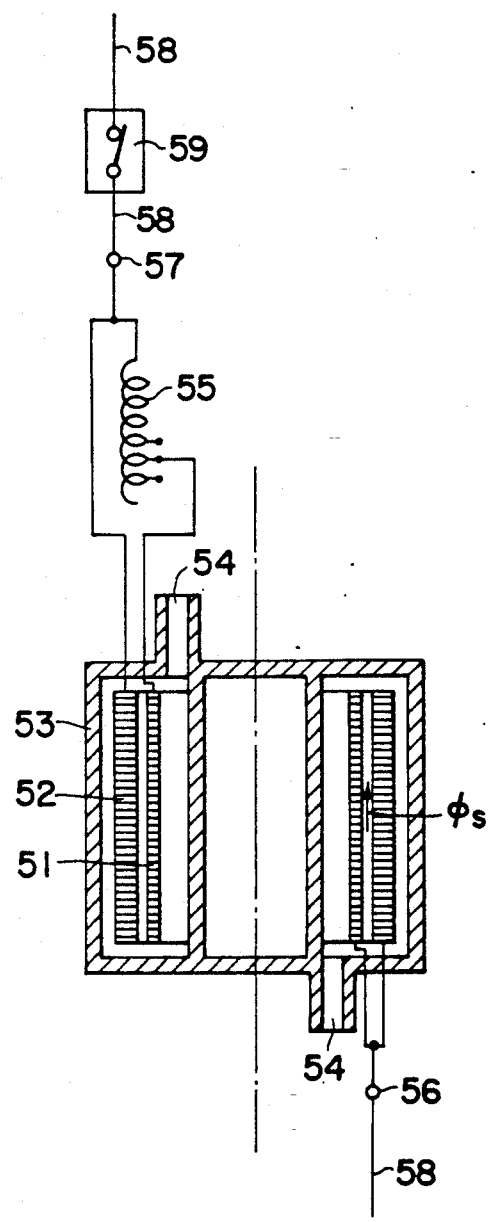
FIG. 1 is a schematic diagram showing the structure of a conventional current limiting device.
Figure 2:
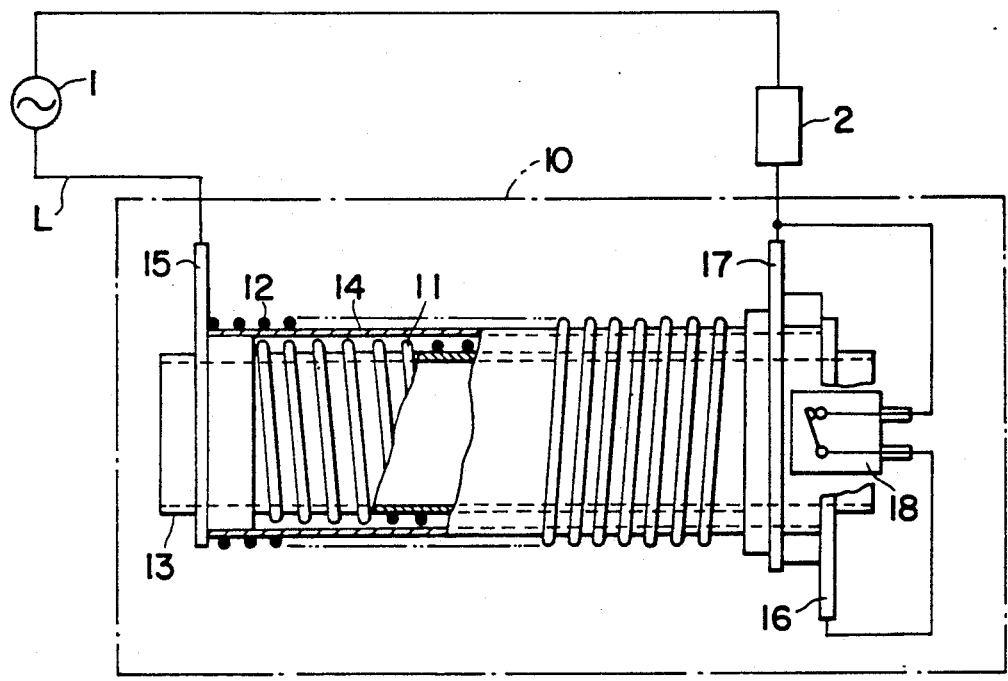
FIG. 2 is a schematic diagram showing the structure of a first embodiment of the current limiting device according to the present invention.
Figure 3:
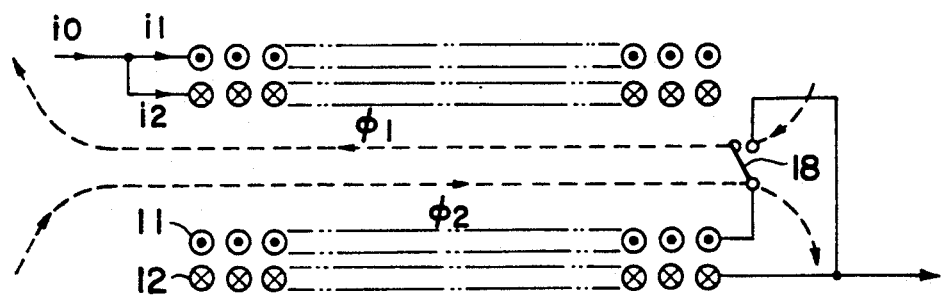
FIG. 3 illustrates the operation of the device shown in FIG. 2.

FIG. 2 is a schematic diagram showing the structure of an embodiment of the superconductive current limiting device of this invention, and FIG. 3 is a diagram used for explaining the operation of the device shown in FIG. 2.

Referring to FIG. 2, the superconductive current limiting device 10 of this embodiment is connected between an a.c. power source 1 and a load 2. The current limiting device 10 is housed in a low temperature maintaining apparatus (not shown) filled with cooling medium such as liquid helium.

The current limiting device 10 will further be described in detail below.

The current limiting device 10 has a first superconductive coil (hereinafter called a trigger coil) 11 of a cylindrical shape having a predetermined critical current value, and a second superconductive coil (hereinafter called a current limiting coil) 12 of a cylindrical shape disposed around the trigger coil 11. The current limiting coil 12 has another predetermined critical current value larger than that of the trigger coil 11 and is constructed to generate a magnetomotive force substantially the same intensity as, and in the opposite direction to, the trigger coil 11. The trigger coil 11 and current limiting coil 12 are wound about coil spools 13 and 14, respectively.

One end of the trigger coil 11 and current limiting coil 12 are connected together to a common terminal 15. The other end of the trigger coil 11 is connected to a trigger coil terminal 16, and the other end of the current limiting coil 12 is connected to a current limiting coil terminal 17.

A switching element 18 such as a vacuum switch is connected to the trigger coil terminal 16 in series with the trigger coil 11. The serially connected switching element 18 and trigger coil 11 are connected in parallel with the current limiting coil 12. The switching element 18 is arranged to be positioned within the magnetic field to be generated by the current limiting coil, as will be described later in more detail. .In response to the current suppression state at the trigger coil 11, the current limiting coil 12 generates a magnetic field which causes the switching element 18 to open. Specifically, when the trigger coil 11 enters a current suppression state, the magnetic field generated by the current limiting coil 12 causes the contact drive armature of the switching element, such as a vacuum switch, to be actuated.

The operation of the embodiment constructed as above will be described with reference to FIG. 3.

During the ordinary operation state of the superconductive current limiting device, the switching element 18 is held in a closed state. Accordingly, the currents i1 and i2 flowing through the current limiting coil 12 and trigger coil 11 of the current limiting device 10 are substantially the same so that the magnetic fluxes $\Phi 1$ and $\Phi 2$ generated by the currents i1 and i2 are cancelled out. Accordingly, the current limiting device is non-inductive and has zero resistance to allow an ordinary operation of the device.

When an abnormal state occurs, i.e., when an overcurrent occurs, the trigger coil 11, having a smaller critical current value, quenches because of the overcurrent and comes to have a large resistance so that the current flowing through the trigger coil 11 is suppressed. Almost all the current flowing through the current limiting device is therefore transferred to the current limiting coil 12 (i1>i2), and the current limiting coil 12 functions as a reactor. Since the switching element 18 is disposed within the magnetic field generated by the current limiting coil 12, it is opened by the magnetic flux $\Phi 1$ ($\Phi 2 = 0$) generated by the current limiting coil 12. The current path of the trigger coil 11 is therefore disconnected, and all the current flows via the current limiting coil 12 to the load 3 while being suppressed. The opening operation of the switching element 18 is carried out simultaneously with the reactor operation of the current limiting coil 12 because the switching element 18 is disposed within the magnetic field generated by the current limiting coil 12.

If the switching element is disposed outside of the generated magnetic field, it is necessary to detect the current suppression state of the current limiting coil and thereafter actuate the switching element by means of a relay or the like. Such an arrangement not only makes the current limiting device complicated, but also requires a longer response time. However, according to this embodiment, the switching element is disposed within the magnetic field generated by the current limiting coil. Accordingly, the device can operate at high speed, while immediately avoiding a thermal trouble caused by an overcurrent, and preventing evaporation of expensive cooling medium.

Furthermore, the magnetic field or flux generated in response to a change in current flowing through the current limiting coil causes the switching element to be actuated, thereby limiting the overcurrent. Therefore, the current limiting device has no resistance except an inductance, thereby allowing continuous and no-loss current limiting operation. Furthermore, as the driving source for the switching element, the generated magnetic field is used so that an additional driving source is not necessary. Still further, since the switching element is disposed within the magnetic field generated by the current limiting coil and the current limiting operation is carried out upon operation of the switching element, only two lead wires are required for each phase. If the switching element is disposed outside of the generated magnetic field, three lead wires are required for each phase. Since the number of lead wires is reduced, the cooling efficiency of the superconductive current limiting device is improved.

Figure 6:
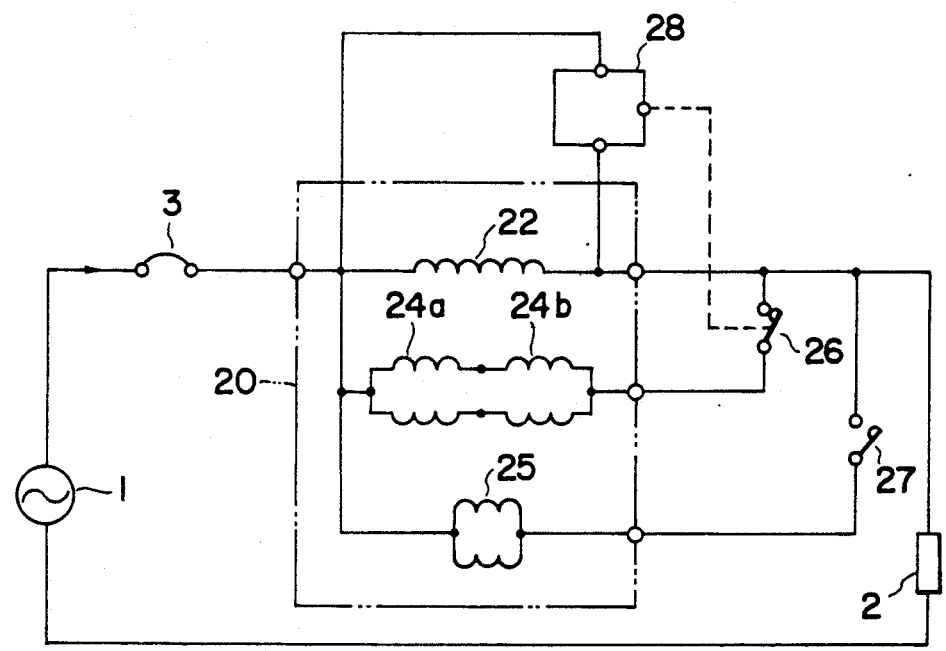
FIG. 6 is a circuit diagram of the device shown in FIG. 4.

FIG. 4 is a schematic diagram showing the structure of a second embodiment of the current limiting device according to the present invention, FIG. 5 is a diagram illustrating the winding directions and interconnections of the coils of the current limiting device shown in FIG. 4, and FIG. 6 is a circuit diagram of the current limiting device shown in FIG. 4.

An a.c. power source 1 is connected in series to a switch 3, load 2, and current limiting device 20 of this embodiment. The current limiting device 20 has a superconductive current limiting coil 22 wound about a spool 21, the superconductive current limiting coil 22 having a predetermined critical current value (Ic1) larger than an overcurrent allowed to pass during the current limiting operation. Two serially connected trigger coils 24a and 24b are coaxially wound about the current limiting coil 22 with a heat insulating shield 23 interposed therebetween. A recovery coil 25 is coaxially wound about the trigger coils 24a and 24b. The heat shield 23 thermally insulates the current limiting coil 22 from the trigger coils 24a and 24b and recovery coil 25. A normally closed trigger switch 26 is connected in series to the serially connected trigger coils 24a and 24b, and a normally open recovery switch 27 is connected in series to the recovery coil 25. These two serial circuits are connected in parallel with the current limiting coil 22.

Referring to FIG. 5 illustrating the winding directions and interconnections of the coils, the current limiting coil 22 is wound as a simple reactor having a predetermined inductance, whereas the trigger coils 24a and 24b and the recovery coil 25 are each wound as non-inductive windings by using Ayrton-Perry windings wherein two coils are wound in parallel and in opposite directions with respect to each other.

A quenching detector 28 is connected across the current limiting coil 22 for the detection of a quenching by the trigger coil and a current limiting operation by the current limiting coil. An output of the quenching detector 28 is supplied to the trigger switch 26 which is opened after the current limiting operation.

Specifically, the quenching detector 28 detects that the current limiting device is in an ordinary state when the voltage across the current limiting coil is considerably lower than the power source voltage, and detects that the trigger coils 24a and 24b have quenched and are in a current limiting state when the voltage drop across the current limiting coil is equal to or larger than a predetermined value.

As a superconductive wire for the trigger coil, a Nb-Ti based a.c. wire, for example, may be used.

Next, the operation of the current limiting device of the second embodiment will be described.

Figure 7:
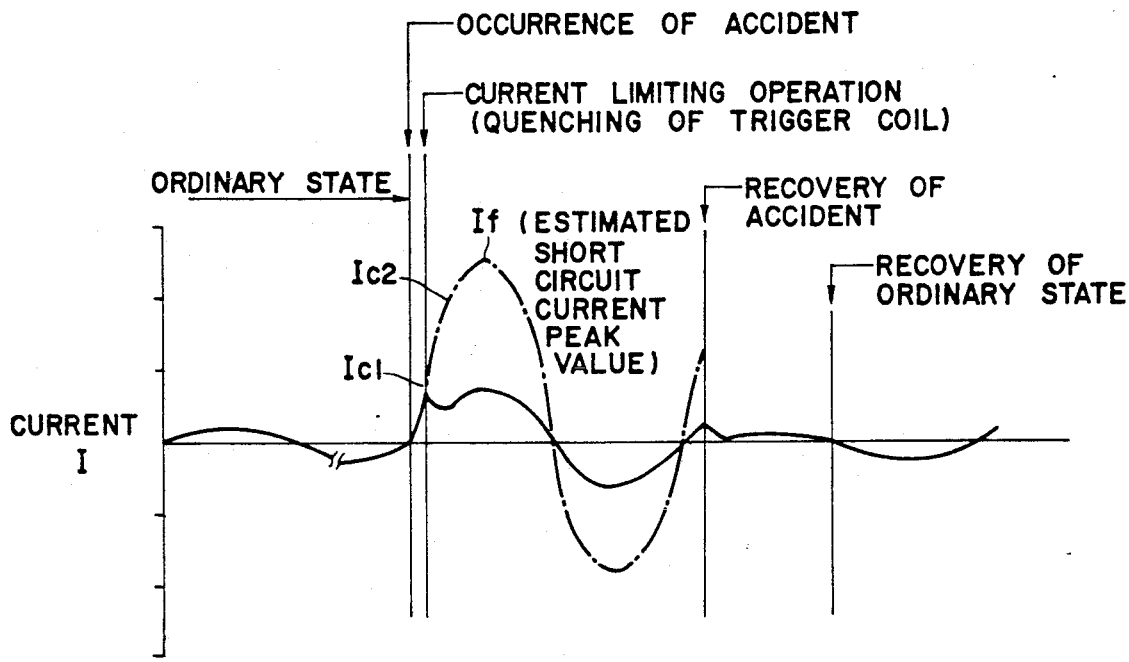
FIG. 7 is a graph showing a change in current during operation of the device shown in FIG. 4.
Figure 8:
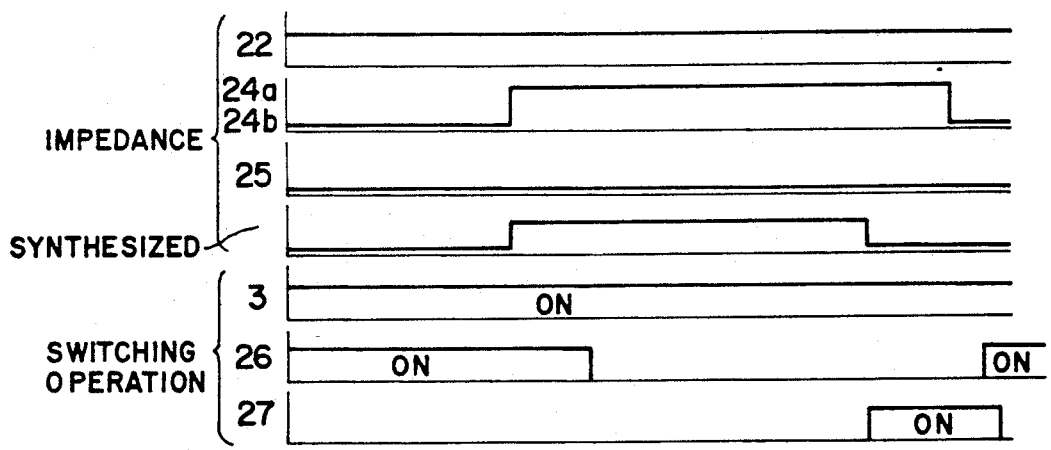
FIG. 8 is a graph showing a change in impedance during operation of the device shown in FIG. 4.

FIG. 7 is a graph showing a change in current in the current limiting device of the embodiment shown in FIGS. 4 to 6, and FIG. 8 is a graph showing a change in impedance upon switching operation.

It is assumed that the switch 3 has ben turned on to supply a power, and that all the current is i0, a current flowing through the current limiting coil is i1, a current flowing through the trigger coils 24a and 24b is it1, and a current flowing through the recovery coil 25 is it2.

During the ordinary operation where the circuit current is smaller than the critical current value of the trigger coils, the trigger switch 26 is normally closed and the recovery switch 27 is normally opened, so that almost all the current i0 flows through the non-inductive trigger coils 24a and 24b. As a result, the impedance of the trigger coils is serial leakage reactance components of the trigger coils, which is extremely small. The current limiting device of this embodiment is therefore substantially non-inductive and has a zero resistance (superconductivity) during the ordinary state.

Accordingly, there is only a small voltage drop across the current limiting device, the voltage drop corresponding to a product of the residual inductance of the trigger coils 24a and 24b and the current it1 flowing therethrough, thereby supplying a power to the load without any practical problem.

When a short circuit trouble of the load 2 occurs, a short circuit current is generated in the circuit with a peak value of If. However, when the current flowing through the trigger coil exceeds its critical current value Ic1, the trigger coils 24a and 24b quench and become an ordinary conductive member having a high resistance. The current flowing through the trigger coils 24a and 24b therefore rapidly decreases, and almost all the current is transferred to the current limiting coil 22. The current limiting device has, therefore, an impedance corresponding to a product of $\omega(2\pi f)$ and the current limiting coil inductance to thereby suppress the short circuit current. This impedance is produced by the inductive phenomenon by the superconductive member and has no resistance and heat generation. The total impedance of the current limiting coil 22, trigger coils 24a and 24b and recovery coil 25 during the current limiting operation is illustrated in FIG. 7. As seen from FIG. 7, the impedance becomes large during the current limiting operation.

When the trigger coils 24a and 24b quench, a large current flows through the current limiting coil 22 and a voltage thereacross rapidly increases. This voltage rise is detected by the quenching detector 28. The output of the quenching detector 28 is supplied to the trigger switch 26 to open it. The reason for opening the trigger switch 26 is to eliminate the following problem. Namely, even almost all the current is transferred to the current limiting coil, a very small current still flows through the trigger coils 24a and 24b so that a Joule heat is generated which evaporates the cooling medium for the superconductive coil, such as, very expensive liquid helium.

There is the case where an accidentally occurring overcurrent is immediately recovered by itself, or where an accident site is removed by the system itself to recover an ordinary state. When such a recovery occurs, it is desirable to make the current limiting device return to its ordinary operation as soon as possible. In such a case, the recovery switch 27 is closed to connect the recovery coil 25 in parallel with the current limiting coil 22. This closing operation may be manually executed by an operator, or may be executed upon reception of an instruction from a controller which monitors the trouble recovery.

The recovery coil 25 is non-inductive and in a superconductive state as described previously, so that almost all the current flowing through the current limiting coil 22 is transferred to the recovery coil 25 with the resultant low impedance of the current limiting device.

The recovery time of the trigger coils 24a and 24b to the superconductive state is in the order of several seconds. By confirming after the lapse of this recovery time that the trigger coils 24a and 24b have recovered the superconductive state, the trigger switch 26 is closed and the recovery switch 27 is again opened to thereby make the current limiting device recover to the ordinary state.

Figure 9:
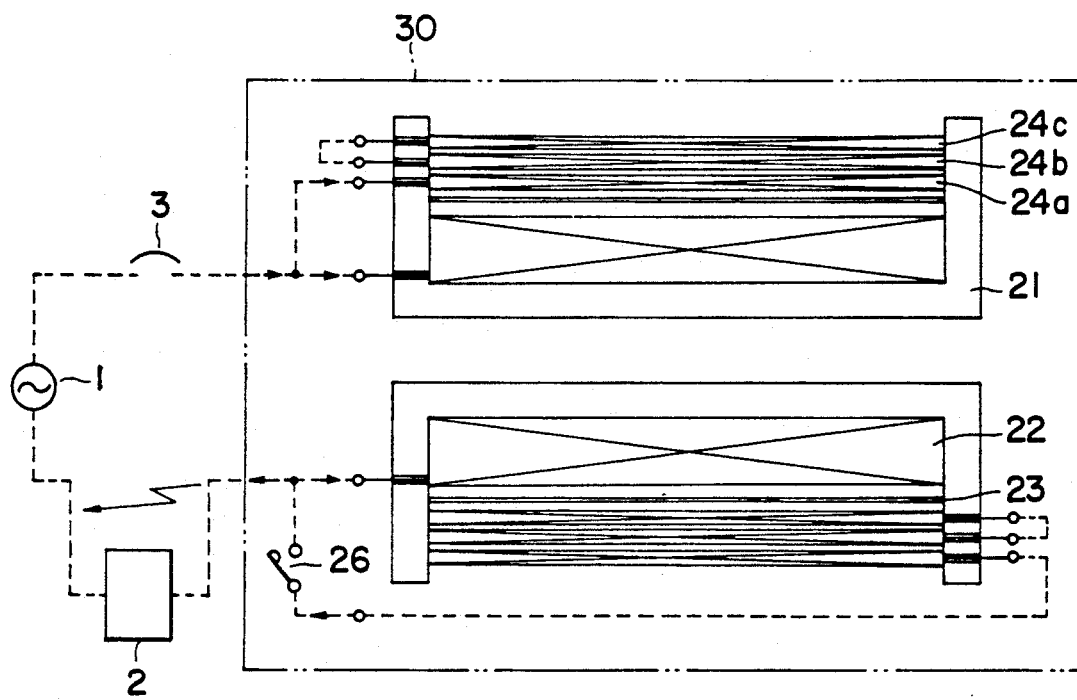
FIG. 9 is a schematic diagram showing the structure of a third embodiment of the current limiting device according to the present invention.

FIG. 9 is a schematic diagram showing the structure of a third embodiment of the current limiting device of this invention. The structure of this embodiment is similar in part to that shown in FIG. 4. Like elements to those shown in FIG. 4 are represented by using identical reference numerals, and the detailed description therefore is omitted.

In this embodiment, three trigger coils 24a, 24b and 24c are wound in a multi-layer structure. The trigger coils 24a to 24c and a switch 26 are connected in series, and this serial circuit is connected in parallel with a current limiting coil 22. The switch 26 is of a normally closed type and is controlled by a control circuit (not shown) so as to be immediately opened upon generation of a predetermined voltage across the current limiting coil 22.

Figure 10:
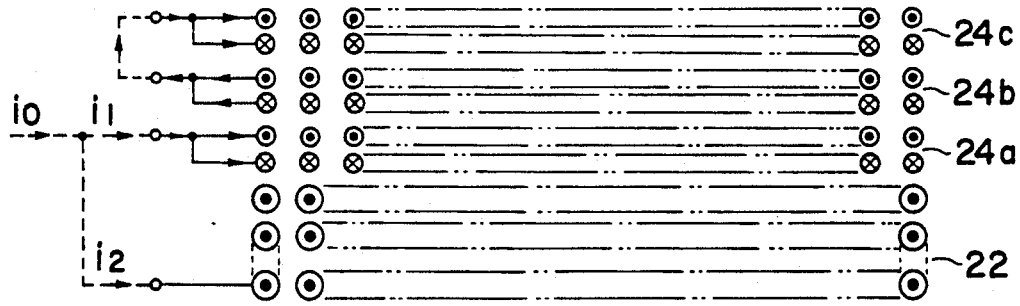
FIG. 10 illustrates the arrangement and interconnections of the coils shown in FIG. 9.
Figure 10:
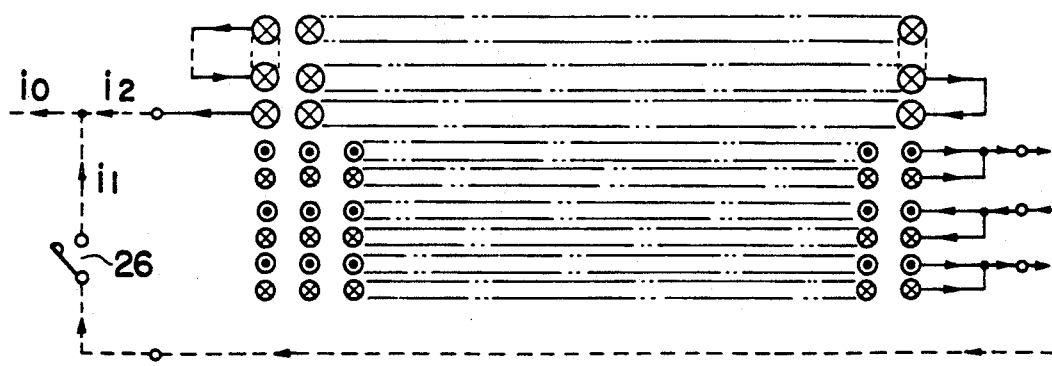

FIG. 10 illustrates the winding directions and interconnections of the coils of the current limiting device shown in FIG. 9. The trigger coils 24a to 24c are wound by means of the above-described AP winding.

As the superconductive wire for the trigger coil, a Nb-Ti based a.c. wire, for example, may be used. This superconductive wire has an extremely high apparent propagation speed of current quenching.

Figure 11:
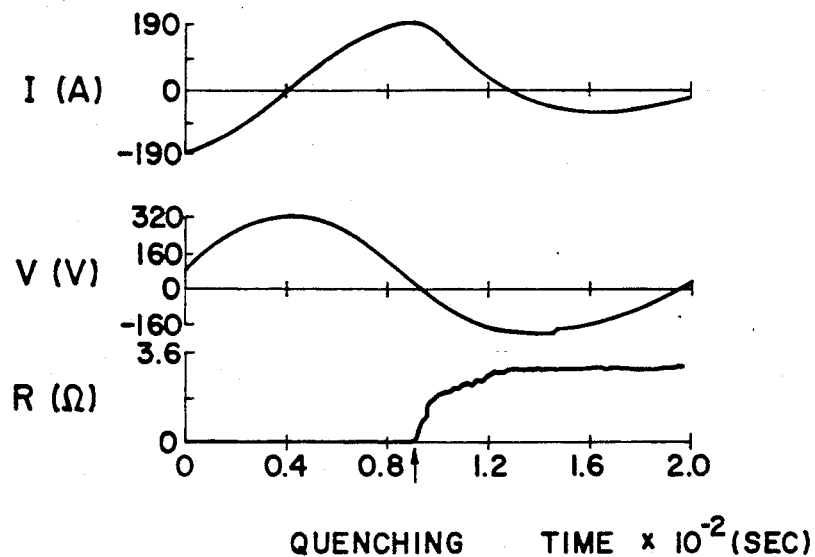
FIG. 11 is a graph showing propagation of quenching.

FIG. 11 is a graph showing an example of a measured quenching propagation speed in an a.c. Nb-Ti superconductive wire of 0.1 mm diameter. Although the apparent quenching propagation speed is 6 km/sec, the following fact has been found from the measurement results. Namely, quenching does not thermally propagate from a certain point, but a number of quenching buds are present beforehand in a superconductive wire of the coil, the number of quenching points increases in proportion to the di/dt of the a.c. current, and the apparent quenching poropagation speed of the coil increases. It is difficult in practice to manufacture a superconductive wire having the same critical current value over the whole length thereof. The critical current value generally changes at various local positions of the wire. The position having a low critical current value becomes a quenching bud. One of the reasons of the phenomenon that the quenching propagation speed increases, is an extremely large di/dt (current increase ratio per unit time) specific to an a.c. short circuit current. Namely, if partial quenching occurs in the coil, the resistance value at that area increases .to suppress the current so that the quenching area propagates thereafter only thermally. However, since a short circuit current has a di/dt 50 to 100 times as large as that of an ordinary current, a current attenuation does not occur even after a first quenching occurs. Therefore, quenching occurs at a number of areas (buds) substantially at the same time. The above phenomena are superposed one upon another so that the whole coil becomes a high resistance body at once and almost all the current is transferred to the current limiting coil immediately.

As described above, upon application of a larger di/dt than that of the critical current value to a plurality of trigger coils made of superconductive wires, all the trigger coils connected in series can be quenched substantially at the same time.

The operation of the current limiting device of this embodiment will be described.

Figure 12:
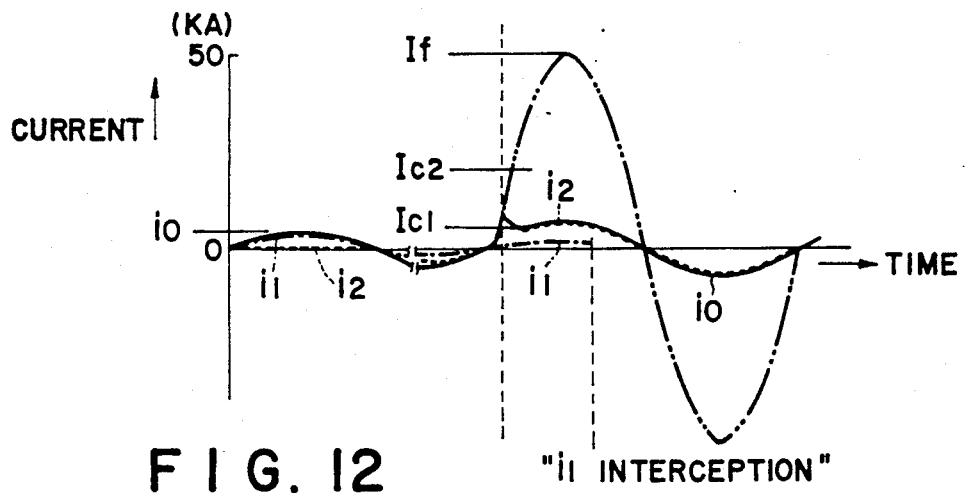
FIG. 12 is a graph showing a change in current during operation of the device shown in FIG. 9.
Figure 13:
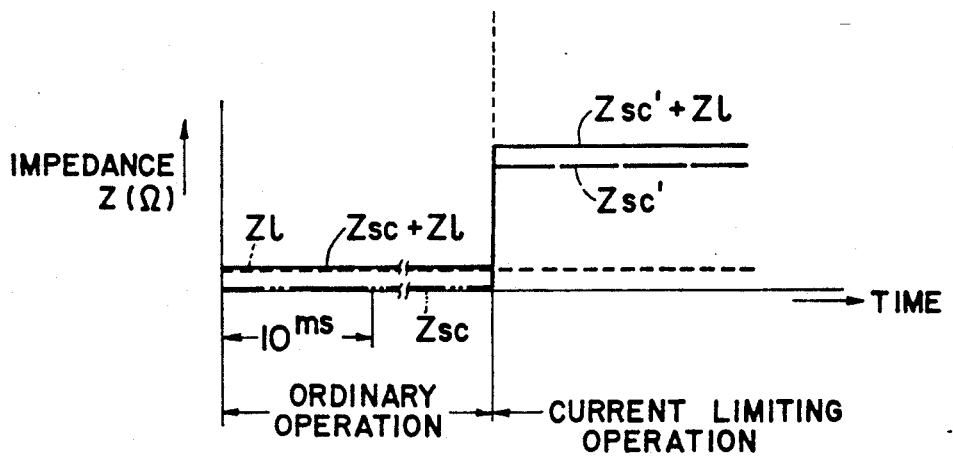
FIG. 13 is a graph showing a change in impedance during operation of the device shown in FIG. 9.

FIGS. 12 and 13 are graphs showing a change in current value and in impedance during the ordinary operation and current limiting operation of the current limiting device shown in FIGS. 9 and 10. FIG. 12 shows the total current i0, a current i1 flowing through the trigger coils 24a to 24c, a current i2 flowing through the current limiting coil, a critical current Ic1 of the current limiting coil 22, and the total current If (estimated short circuit current) at a load short circuit when the current limiting device is not connected. FIG. 13 shows an impedance Zsc of the current limiting device during the ordinary operation, an impedance Zsc' during the current limiting operation, and a line impedance Z1.

Referring to FIG. 9, during the ordinary operation of the circuit, the total current i0 is suppressed to a value smaller than the critical current Ic1 of the trigger coils 24a to 24c, and almost all the current flows through the non-inductive trigger coils 24a to 24c. Therefore, there is produced a very small voltage across the current limiting coil corresponding to the product of the leakage inductance of the trigger coils 24a to 24c and the total current, so that the switch 26 maintained closed to thereby supply voltage and current to the load 2.

When a load short circuit occurs, a short circuit current flows through the circuit. When the short circuit current exceeds the critical current value (Ic1) of the trigger coils, they quench substantially at the same time and change to a high resistance body at an extremely high speed as shown in FIG. 11. Almost all the current having passing through the trigger coils 24a to 24c is transferred to the current limiting coil 22. As a result, due to the reactor operation by the current limiting coil 22, the short circuit current is suppressed as shown in FIG. 12. At the same time, a certain voltage is generated across the current limiting coil 22. When a predetermined voltage level is established, the switch 26 is opened by the switch controller (not shown) to interrupt the current flowing through the trigger coils 24a to 24c. Since the current limiting coil 22 is designed to have a current limiting peak value in excess of the critical current value Ic2, it is in a superconductive state so that loss is not generated after the switch 26 is opened. In addition, the trigger coils 24a to 24c return to their superconductive state after a lapse of a predetermined cooling period after the switch 26 is opened. Therefore, the current limiting device can be returned to the ordinary state by merely closing the switch 26 after the removal of the abnormal state.

In this embodiment, where a plurality of trigger coils 24a to 24c connected in series are used, the number of trigger coils may be changed while minimizing the residual inductance and increasing the resistance value during the quenching as desired. The loss Psc generated by the trigger coils during the current limiting operation is expressed as follows:

$$Psc \alpha E^2/RN$$

where E is a circuit voltage (V), R is a resistance ($\Omega$) of the trigger coils during quenching, and N is the number of trigger coils connected in series. The loss can therefore be suppressed to a value inversely proportional to the number of trigger coils connected in series.

In the second and third embodiments, the current limiting coil is disposed under the trigger coils. Conversely, the current limiting coil may be disposed above the trigger coils, while obtaining the same advantageous effects.

Furthermore, in the disclosed embodiments, the trigger coils and current limiting coil are coaxially superposed one upon another. They may also be disposed at different positions along the spool. Furthermore, instead of the current limiting coil, a superconductive impedance element may be used.

Furthermore, in the disclosed embodiment, three trigger coils are used. However, the number of trigger coils can be selected arbitrarily.

Still furthermore, the switch may be housed within the low temperature container instead of mounting it within a room temperature area outside of the low temperature container.

What is claimed is:

1. A superconductive current limiting device for suppressing an overcurrent in a current path, comprising:
   a first superconductive coil having a predetermined critical current value;
   a second superconductive coil having a critical current value larger than said first superconductive coil, said second superconductive coil being constructed to generate a magnetomotive force substantially the same intensity as, and in the opposite direction to, said first superconductive coil; and
   switching means connected in series to said first superconductive coil, said switching means being adapted to open in response to a current suppressing state by said second superconductive coil, said second superconductive coil being connected in parallel with a serial connection of said switching means and said first superconductive coil, and said switching means being a magnetism sensitive switch which is actuated in response to a change of the magnetic field generated by said second superconductive coil.

2. A superconductive current limiting device according to claim 1, wherein said switching means is disposed within the magnetic field to be generated by said second superconductive coil.

3. A superconductive current limiting device for suppressing an overcurrent in a current path, comprising:
- a plurality of first superconductive coils (trigger coils) connected in series, wound noninductively, and having a first critical current value;
- a second superconductive coil (recovery coil) wound non-inductively;
- a current limiting element having an optional inductance and a second critical current value larger than said first critical current value;
- quenching detecting means for detecting a quenching of said first superconductive coils;
- normally closed first switching means connected in series to said first superconductive coils, said first switching means being opened in response to a quenching detection output from said quenching detecting means; and
- normally open second switching means connected in series to said second superconductive coil, said second switching means being closed after a current limiting operation of said current limiting element;

wherein both of a first serial circuit composed of said first superconductive coils and said first switching means and a second serial circuit composed of said second superconductive coil and said second switching means are connected in parallel with said current limiting element.

4. A current limiting device according to claim 3, wherein said current limiting element comprises a normal conductive impedance element.

5. A current limiting device according to claim 4, wherein said current limiting element comprises a third superconductive coil and wherein said first superconductive coils, second superconductive coil and third superconductive coil are coaxially disposed.

6. A superconductive current limiting device for suppressing an overcurrent in a current path, comprising:
- a plurality of first superconductive coils (trigger coils) each wound non-inductively and having substantially the same first critical current value;
- a current limiting element having an optional inductance and a second critical current value larger than that of said first superconductive coils; and
- a normally closed switch connected in series to said first superconductive coils, said switch being opened to separate said first superconductive coils from the current path after current limiting operation by quenching of said first superconductive coils;

wherein a serial circuit of said first superconductive coils and said switch is connected in parallel with said current limiting element.

7. A current limiting device according to claim 6, wherein said current limiting element is a normal conductive impedance element.

8. A current limiting device according to claim 7, wherein said current limiting element is a second superconductive coil and said first superconductive coils and said second superconductive coil are coaxially disposed.

* * * * *